US010794803B2

(12) United States Patent
Grölz

(10) Patent No.: US 10,794,803 B2
(45) Date of Patent: Oct. 6, 2020

(54) FIXATIVE COMPOSITION FOR CELL-COMPRISING LIQUID SAMPLES AND METHODS AND KIT THEREOF

(71) Applicant: QIAGEN GMBH, Hilden (DE)

(72) Inventor: Daniel Grölz, Solingen (DE)

(73) Assignee: QIAGEN GMBH, Hilden (DE)

(*) Notice: Subject to any disclaimer, the term of this patent is extended or adjusted under 35 U.S.C. 154(b) by 0 days.

(21) Appl. No.: 15/305,869

(22) PCT Filed: May 27, 2015

(86) PCT No.: PCT/EP2015/061678
§ 371 (c)(1),
(2) Date: Oct. 21, 2016

(87) PCT Pub. No.: WO2015/181220
PCT Pub. Date: Dec. 3, 2015

(65) Prior Publication Data

US 2017/0052095 A1 Feb. 23, 2017

(30) Foreign Application Priority Data

May 28, 2014 (EP) .................................... 14170296

(51) Int. Cl.
*G01N 1/30* (2006.01)

(52) U.S. Cl.
CPC ......... *G01N 1/30* (2013.01); *G01N 2001/307* (2013.01)

(58) Field of Classification Search
CPC ...... G01N 1/30; G01N 1/36; G01N 2001/305; G01N 1/44; G01N 1/06; G01N 1/312; G01N 2001/315; G01N 1/31; G01N 2001/307; G01N 31/22; G01N 33/5005; G01N 33/689; G01N 2015/1018; A61L 27/16; A61L 27/38; A61L 27/52; A61L 2300/604; A61L 27/54; A61L 27/58; A61L 2300/414; A61L 27/3808; A61L 27/20; A61L 2300/404; A61L 2300/45; A61L 2430/32; A61L 27/26; A61K 45/06; A61K 2039/505; A61K 31/519; A61K 38/00; A61K 38/179; A61K 39/3955; A61K 2300/00; A61K 2035/126; A61K 35/44; A61K 31/445; A61K 31/738; A61K 47/18; A61K 47/186; A61K 47/20; A61K 47/22; A61K 9/0014; A61K 9/0019; A61K 9/0024; A61K 2800/81; A61K 2800/86; A61K 35/33; A61K 38/1709; A61K 38/193; A61K 8/64; A61K 9/06; A61K 38/1866; A61K 31/721; A61K 38/1891; A61K 38/195; A61K 38/30; C07K 14/575; C07K 14/71; C07K 16/22; C07K 2317/76; C07K 2319/30; C07K 16/44; C07K 2317/24; C07K 2317/56; C07K 2317/565; C12N 15/1136; C12N 15/1138; C12N 2310/11; C12N 2500/34; C12N 2501/115; C12N 2501/148; C12N 2501/165; C12N 2501/17; C12N 2501/21; C12N 2501/998; C12N 2513/00; C12N 2533/50; C12N 2533/80; C12N 2537/10; C12N 5/069; C12N 5/0692; C12N 1/04; C12Q 1/68; C12Q 1/6806; C12Q 1/686; C12Q 1/6883; C08L 33/02; C08L 5/02; A61Q 19/08; C08G 63/21; C08G 63/668; C08G 63/20; C08G 63/914; C12P 19/08; C12P 21/00; A61P 35/00; A61P 19/08; A61P 19/10; A61P 35/04; A61P 17/02; A61P 9/10; A61P 17/00; A61P 23/02; A61P 9/00; A61P 17/18; A61P 11/00; A61P 11/06; A61P 25/00; A61P 27/02; A61P 27/06; A61P 29/00; A61P 35/02; A61P 37/02; A61P 37/06; A61P 43/00; A61P 9/04; Y10T 436/10; Y10T 436/105831; Y10T 436/106664; C08J 2201/024; C08J 2207/10; C08J 2367/00; C08J 9/0023

See application file for complete search history.

(56) References Cited

U.S. PATENT DOCUMENTS

| | | | | |
|---|---|---|---|---|
| 4,946,669 | A | 8/1990 | Siegfried et al. | |
| 9,562,836 | B2 * | 2/2017 | Gerigk | G01N 1/36 |
| 9,696,247 | B2 * | 7/2017 | Goldsborough | G01N 1/30 |

FOREIGN PATENT DOCUMENTS

| | | | |
|---|---|---|---|
| CN | 101088002 | A | 6/2005 |
| CN | 101046434 | A | 10/2007 |
| EP | 0311035 | A2 | 4/1989 |
| EP | 1455174 | A1 | 9/2004 |
| EP | 1965190 | A1 | 9/2008 |
| JP | H01-199160 | A | 8/1989 |
| JP | 2004-271497 | A | 9/2004 |
| JP | 2008-502913 | A | 1/2008 |
| JP | 2010-518870 | A | 6/2010 |
| WO | 2005/121747 | A1 | 12/2005 |
| WO | 2011/027089 | A1 | 3/2011 |

OTHER PUBLICATIONS

International Search Report for PCT/EP2015/061678, dated Aug. 14, 2015.

* cited by examiner

*Primary Examiner* — Deborah K Ware
(74) *Attorney, Agent, or Firm* — Medler Ferro Woodhouse & Mills PLLC

(57) ABSTRACT

A formal-in-free fixative composition, suitable for the fixation of cells in particular in liquid samples, the use of said fixative for the treatment of biological samples, a method for the treatment of cell-comprising liquid samples, a kit comprising said fixative and a method for diagnosis of cell-comprising biological material samples.

23 Claims, 9 Drawing Sheets

A

B

A

B

FIXATIVE COMPOSITION FOR CELL-COMPRISING LIQUID SAMPLES AND METHODS AND KIT THEREOF

The work leading to this invention has received funding from the European Community's Seventh framework Programme (FP7/2007-2013) under grant agreement no. 222916, SPIDIA project.

The present invention refers to a formaline-free fixative composition, suitable for the fixation of cells in particular in liquid samples, the use of said fixative for the treatment of biological samples, a method for the treatment of cell-comprising liquid samples and a kit comprising said fixative.

A great number of fixatives for fixation of biological materials are known. Most of them are described for solid samples like tissue. However, it is as well important to have the opportunity to fix biological material comprised in liquid samples, thereby maintaining the cell morphology and histology as well as molecular biological contents of the sample cells. Fine needle aspiration is a minor invasive diagnostic procedure used to investigate e. g. superficial lumps or masses. In this technique a thin, hollow needle is inserted into the mass for sampling of cells. Fine needle aspirates often consists of a mixture of tiny tissue samples and single cells in body fluid like lymph or blood. A standard procedure for cytodiagnosis using a fine needle aspiration (FNA) biopsy is to smear a part of the aspirate directly after aspiration onto a slide. The smears can be air-dried and stained or they might be fixed e.g. with 95% ethanol followed by staining. Other techniques involve fixation of the cells of the FNA sample in formalin and preparation of paraffin embedded cell blocks.

Both methods are of limited use for molecular analysis. Biomolecule purification from air dried or alcohol fixed smears is difficult to perform and often results in low yield and quality. Fixatives that contain formaldehyde induce cross-links and modifications in the biomolecules, which lead to inhibition in sensitive downstream applications such as quantitative PCR.

Other methods to preserve FNA specimens for molecular testing such as cryopreservation or liquid-based fixation in alcohol compromise or even destroy the morphology of the cells. Alcohol based fixatives effect heavy shrinkage of cells i.e. of the cytoplasma of cells, in case the cell samples are liquid based (in contrast to cells in a solid tissue, growing as monolayer or smeared on slides) and fixed in a liquid fixative.

Fine needle aspiration (FNA) biopsy is a minimally invasive technique in comparison to open surgical biopsy. It is a sensitive, inexpensive technique for diagnosing of benign and malignant palpable and nonpalpable lesions identified e.g. in breast, thyroid, lymph nodes, and other organs. FNA samples are liquid, comprising blood (up to 70%), single cells and more or less tiny pieces of cell aggregates. The most common way for cytological examination of a FNA sample is to smear a small volume of the FNA immediately after retraction on a microscopic slide. According to the requirements of the stain to be used, the smear is either air-dried for haematological stains like May/Grunwald/Giemas, Diff Quik, Giemsa etc. or fixed in an alcohol fixation for staining according to Papanicolaou (pap) or by Hematoxylin and Eoslin (H&E). Most commonly used alcoholic fixative is 95% ethanol, but also a couple of commercially available spray fixatives exist.

As an alternative to smearing a liquid FNA sample on a slide, cells are often collected by centrifugation. The resulting cell pellet can be fixed with e.g. formalin or formalin free fixatives like Finefix®, centrifuged again and the fixed cell pellet is mixed with e.g. agarose to form a solid matrix. This solid matrix can be treated like a tissue sample i.e. it is placed into a cassette, processed and paraffin embedded. Sections of such a cell block can be stained with H&E or with an immunohistochemistry assay. Advantage of the cell block technology is that multiple sections from one FNA sample can be stained differently. The disadvantage is that the procedure is difficult to perform, needs a lot of equipment and takes several days.

The molecular testing of samples for diagnosis and classification of a disease is becoming more common and increasingly important. Residual material from FNA biopsies remaining from conventional cytological staining could be used for molecular tests. However, when the residual liquid material is directly fixed with e.g. commercially available fixatives, said material cannot be used any more for cytological retesting because the morphology of cells is destroyed.

Extraction of biomolecules from sections of a cell block is possible, however the technology is time consuming, biomolecules are mostly degraded, especially from formalin fixed samples, and the yield of biomolecules from such samples is generally very low. Furthermore, as mentioned above, formalin chemically modifies biomolecules like proteins and nucleic acids by crosslinking and leads to biomolecule degradation and inhibition of downstream applications.

As a possible solution, it was recently suggested to cryopreserve FNA sample material, remaining from slide preparation (Ladd et al., Cancer Cytopathology 2011 Apr. 25; 119(2):102-10). This method has several severe disadvantages, because in a clinical environment it is logistically difficult and expensive to maintain the cooling chain. In addition morphology as well as sensitive biomolecules like RNA are compromised by thawing cells.

Despite the fact that some reagent compositions and methods based on alcoholic and/or crosslinking agents are described as stabilizing cell morphology and biomolecules, there is currently no solution available for direct fixation and preservation of single cells or tiny cell-lumps from a biological fluid in a liquid fixative in a way that cell morphology as well as the biomolecules are preserved. For example in U.S. Pat. No. 7,138,226 B2 it is mentioned that cells may be processed for cytology but it is not explained, how this can be achieved. In US2010/0068690 a composition is described for preservation of phosphoproteins and cellular morphology in several biological samples, amongst others also FNA samples. However, only stability for phosphoproteins in FNA samples is shown, but not if and how stabilized cells can be investigated by cytological staining. In EP 1 455 174 A1 a fixative is described which allows morphological evaluation of tissue together with a recovery of intact proteins and nucleic acids and it is mentioned that it may be used for cytological preparations. However, again, this is only described for FNAs smeared on slides.

Experiments of the applicant have shown that available fixatives lead to heavy shrinkage of cells in particular the cytoplasmic parts when cells in solution are mixed with the fixative (see Examples). Another unsolved problem with existing fixatives refers to the avoidance of blood protein precipitation. FNA samples often contain a high amount of whole blood, up to 70% depending on the sample type. Precipitated blood proteins can obscure cell morphology when smeared on a slide (see Examples).

In order to allow both molecular and traditional cytological testing from the same fine needle aspiration specimen, a reagent and method for a liquid based fixation is required providing stabilization of molecular content and preservation of cell morphology in a liquid sample, even in the presence of a high content of whole blood, but without interference with conventional cytological staining methods.

This object is met by providing a formalin-free fixative composition according to claim 1, the use of said composition for treatment and/or storage of a biological cell-comprising sample and a method for treatment of a cell-comprising liquid sample wherein a collected liquid sample is contacted at least partially with said fixing composition and mixed. The fixative composition and optionally further means suitable for carrying out the treatment method can be provided in a kit. Such a prepared sample can then be used for e.g. biomolecule isolation, sample/cell staining or sample embedding or infiltration by any known method.

According to the invention a composition is described for fixation and preservation of a liquid biological sample containing cells, e.g. a mixture of cells, like tumor cells, whole blood and different other cell types in a way that cell morphology and biomolecules are preserved. In addition the liquid biological sample may contain small pieces of a solid tissue.

Furthermore, a method is described how to use said composition for fixation of a liquid cell-comprising sample, e.g. a fine needle aspiration specimen for cytological staining and biomolecule purification without interfering into the conventional diagnostic workflow. An exemplified workflow is described including the use of a collection device filled with the composition.

A further aspect of the present invention refers to the use of such prepared samples in processing methods, how to use aliquots for cytological staining or for extraction of biomolecules e.g. nucleic acids from the fixed sample.

The formalin-free fixative composition according to the present invention is represented by a composition comprising i) 30-70 vol % of an alcohol, selected from ethanol or isopropanol
ii) 2-15% of an organic acid
iii) 10-30% of a hydroxyl compound different from i)
iv) at least 10, preferably at least 15 vol % of water and having a pH in the range of 2 to 5.

Preferably the composition is not only free of formalin or formaldehyde in any other form, but in general free of a crosslinking fixative. In addition, the composition is further as well free of acetone. In its easiest embodiment the composition is consisting of the components i) to iv). In any case, however, an alkali compound or a buffering agent might be used for pH adjustment (optionally in addition to compounds i) to iv).

Compound i) is an alcohol, wherein said alcohol is selected from ethanol or Isopropanol. It was found that both said alcohols result in a minor amount of shrinkage of the cells than e.g. methanol. Said alcohol(s) is/are comprised in an amount of 30 to 70 vol %, wherein, if both types of alcohols are used this is representing the combined amount. Preferably the alcohol is comprised in an amount of 40 to 60 vol %, more preferred in an amount of 50%. The preferred alcohol is ethanol.

If in the present application a range is given, e.g. "30 to 70 vol %" it should be understood that this means any amount within said range is as well disclosed, which is 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 664, 65, 66, 67, 68 and 69 vol %.

Compound ii) is an organic acid, preferably a weak organic acid. With weak acid according to the present invention is meant preferably an acid having a pKa value of from 2 to 12, more preferably from 3.5 to 8, most preferably from 4 to 7.5. More preferably said organic acid belongs to the group of amino acids, or carboxylic (mono-, bi-, tri-, polycarboxylic) acids, e.g. formic acid, fumaric acid, maleic acid, tartaric acid, citric acid, most preferably acetic acid or propionic acid, wherein acetic acid is particularly preferred. The organic acid is comprised in the composition in an amount of 2 to 15% (which means as well in an amount of 3, 4, 5, 6, 7, 8, 9, 10, 11, 12, 13 or 14% or in amounts therebetween), preferably 4 to 15%, more preferred in amount of 4 to 10% and most preferred in an amount of 6 to 10%. If more than one type of organic acid is used the mentioned amounts are total amounts. It should be understood that the amounts given are either in % (v/v), if a liquid component is used, e.g. glacial acid, or in % (wt/v), if a solid compound is added.

Compound iii) is a hydroxyl compound, which means a compound having at least one free hydroxyl group, however, it is preferred that said compound is not a sugar, in particular not trehalose. Preferably compound iii) is diethylene glycol monoethyl ether acetate (DEGMEA), diethylene glycol monoethyl ether, a diol or triol, wherein diethylene glycol monoethyl ether acetate (DEGMEA) is particularly preferred.

Examples for diols or triols are 1,2-ethanediol, 1,2-propanediol, 1,3-propanediol, 2-methyl-1,3-propanediol, 2-methyl-1,2-propanediol, 2,2-diemthyl-1,3-propanediol, 2,2-diethyl-1,3-propanediol, 2-methyl-2-propyl-1,3-propanediol, 2-butyl-2-ethyl-1,3-propanediol, dihydroxyaceton, 2,2-dibutyl-1,3-propanediol, 3-methoxy-1,3-propanediol, 3-methoxy-1,2-propanediol, 3-methoxy-2,3-propanediol, 2-methoxymethyl-1,3-propanediol, 3-ethoxy-1,3-propanediol, 3-ethoxy-1,2-propanediol, 3-ethoxy-2,3-propanediol, 3-allyloxy-1,2-propanediol, 2,3-butanediol, 2,3-dimethyl-2,3-butanediol, 3,3-dimethyl-1,2-butanediol, 1,2-pentanediol, 1,3-pentanediol, 1,4-pentanediol, 1,5-pentanediol, 2,3-pentanediol, 2,4-pentanediol, 2-methyl-2,4-pentanediol, 2,4-dimethyl-2,4-pentanediol, 2,2,4-Trimethyl-1,3-pentanediol, 1,2-hexanediol, 1,3-hexanediol, 1,4-hexanediol, 1,5-hexanediol, 1,6-hexanediol, 2,3-hexanediol, 2,4-hexanediol, 2,5-hexanediol, 3,4-hexanediol, 2,5-dimethyl-2,5-hexanediol, 2-ethyl-1,3-hexanediol, 1,2-heptanediol, 1,3-heptanediol, 1,4-heptanediol, 1,5-heptanediol, 1,6-heptanediol, 1,7-heptanediol, 1,8-octanediol, 1,2-octanediol, 1,3-octanediol 1,4-octanediol, 1,5-octanediol, 1,6-octanediol, 1,7-octanediol, 1,2-nonanediol, 1,9-nonanediol, 1,10-decanediol, 1,2-decanediol, 1,2-undecanediol, 1,11-undecanediol, 1,12-dodecanediol, 1,2-dodecanediol, diethyleneglycol, dipropyleneglycol, triethyleneglycol, tripropyleneglycol, tetraethyleneglycol, tetrapropyleneglycol, pentaethyleneglycol, pentapropyleneglycol, hexaethylenglycol, hexaapropylenglycol, heptaethylen-glycol, heptapropyleneglycol, octaethyleneglycol, octapropyleneglycol, nona-ethyleneglycol, nonapropyleneglycol, decaethyleneglycol, decapropyleneglycol, cis- or trans-1,2-cylopentanediol, cis- or trans-1,3-cylopentanediol, cis- or trans-1,2-cylohexanediol, cis- or trans-1,3-cylohexanediol, cis- or trans-1,4-cylohexanediol, cis- or trans-1,2-cyloheptanediol, cis- or trans-1,3-cyloheptanediol, cis- or trans-1,4-cyloheptanediol, 1,2,3-cyclopentanetriol, 1,2,4-cyclopentanetriol, 1,2,3-cyclohexanetriol, 1,2,4-cyclohexanetriol, 1,2,3-cyloheptanetriol, 1,2,4-cyloheptanetriol, 1,2,3-propanetriol, 3-ethyl-2-hydroxymethyl-1,3-propanediol, 2-hydroxymethyl-2-methyl-1,3-propanediol, 2-hydroxymethyl-2-methyl-1,3-propanediol, 1,2,3-butanetriol, 1,2,4-butanetriol, 2-methyl-1,2,3-butanetriol, 2-methyl-1,2,4-butanetriol, 1,2,3-pentanetriol, 1,2,4-pentanetriol, 1,2,5-pentanetriol, 2,3,4-pentanetriol, 1,3,5-pentanetriol, 3-methyl-1,3,5-pentanetriol, 1,2,3-hexanetriol, 1,2,4-hexanetriol, 1,2,5-hexanetriol, 1,2,6-hexanetriol, 2,3,4-hexanetriol, 2,3,5-hexanetriol, 1,2,3-heptanetriol, 1,2,7-heptanetriol, 1,2,3-octanetriol, 1,2,8-octanetriol, 1,2,3-nonanetriol, 1,2,9-nonanetriol, 1,2,3-decanetriol, 1,2,10-decanetriol, 1,2,3-undecanetriol, 1,2,11-undecanetriol, 1,2,3-dodecanetriol, 1,1,12-dodecanetriol, 2,2,-bis(hydroxymethyl)-1,3-propanediol, 1,2,3,4-butanetetraol, 1,2,3,4-pentanetetraol, 1,2,3,5-pentanetetraol, 1,2,3,4-hexanetetraol, 1,2,3,6-hexanetetraol, 1,2,3,4-heptanetetraol, 1,2,3,7-heptanetetraol, 1,2,3,4-octanetetraol, 1,2,3,8-octanetetraol, 1,2,3,4-nonanetetraol, 1,2,3,9-nonanetetraol, 1,2,3,4-decanetetraol, 1,2,3,10-decanetetraol, trimethylolpropanol, pentaerythritol, sugar like mannite, sorbitol or arabitol, hexanehexol, 1,2,3,4,5-pentanepentol and 1,2,3,4,5,6-hexanehexaol. Most preferred additional components are diols and/or triols like 1,3-butanediol, 1,4-butanediol, 1,3-propanediol, 1,2-propanediol, 3-methyl-1,3,5-pentanetriol, 1,2,6-hexanetriol, glycerin, glycol; and polyethylene glycol (PEG). The PEG preferably has a melting point below ambient temperature. It may have an average molecular weight of about 800 daltons or less, preferably about 600 daltons or less, more preferably about 400 daltons or less, and even more preferably about 300 daltons or less; the average molecular weight may be between 0 to about 800 daltons, between about 100 to about 600 daltons, or between about 200 daltons to about 400 daltons. The term "about" when referring to the average molecular weight of PEG means that a variation of 10, 25 or 50 daltons is permissible. The higher molecular weight PEG (e. g. 1000 average molecular weight or more) are not preferred although they may be present in amounts of less than 5%, 10% or 20% of the molecular weight distribution. The melting point of PEG 400 is about 4° C. to about 8° C. and PEG 600 is about 20° C. to about 25° C. The melting point of PEG used in the composition may be 37° C. or less, 32° C. or less, 27° C. or less, 22° C. or less, 15° C. or less, 10° C. or less, or 5° C. or less; the lower melting points are preferred.

Preferred compounds representing compound iii) are diethylene glycol monoethyl ether acetate (DEGMEA), diethylene glycol monoethyl ether, polyethylene glycol, or a diol or triol, said diol or triol is preferably selected from ethylene glycol, diethylenglycol, glycerol, hexane triol, 1,3-butanediol, 2,3-butanediol, 1,3-propanediol, 1,5-pentandiol, 2-methyl-2,4-pentanediol, and dipropylglycol, wherein diethylene glycol monoethyl ether acetate (DEGMEA) is particularly preferred.

The total amount of component iii) in the composition is 10 to 30% (including 11, 12, 13, 14, 15, 16, 17, 18, 19, 20, 21, 22, 23, 24, 25, 26, 27, 28, 29%), wherein a combination of the compounds mentioned before can be used. The preferred amount of compound iii) is 15 to 30%, particularly preferred 20%. It should be understood that the amounts given are either in % (v/v), if a liquid component is used, or in % (w/v), if a solid compound is added.

As compound iv) the composition comprises water, particularly destilled or double destilled (dd) water or ultraclean water. With "ultraclean" is meant that the water is essentially free, preferably completely free of RNAses and other remainders influencing the stability of the cells or biological (macro)molecules of the biological material. With "essentially free" is meant that less than 0.1%, preferably less that 0.01% more preferred less than 0.001% and particularly preferred less than 0.0001% (wt/v or v/v) contaminants are comprised in the water.

Said water is added to the composition in an amount of at least 10 vol %, preferably at least 15 vol %, even more preferred at least 20 vol %, most preferred water is added to the composition in an amount balancing ad 100%.

The pH value of the final composition should be in the range of pH 2 to pH 5 (including the range 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9), (preferably in the range from pH 2 to pH 4, more preferred pH 2.1 to 3 and particularly preferred pH 2.2 to 2.5. Said pH either is obtained by the combination of the compounds i) to iv) due to the high amount of acid, or might be adjusted by the addition of an additional acid or a suitable basic compound, e.g. NaOH.

Further the pH can be adjusted by a suitable buffering agent comprised in the composition, buffering in the desired pH range, e.g. NaAcetate.

In the simplest embodiment the composition doesn't comprise more components as mentioned up to here, thus, the composition consists essentially of components (i) to iv) and optionally a pH regulator. With "consists essentially" is meant that less than 0.1%, preferably less that 0.01% more preferred less than 0.001% and particularly preferred less than 0.0001% (wt/v or v/v) of further ingredients or contaminants are comprised in the composition.

Said fixative composition can be used for the treatment and/or storage of biological cell-comprising samples, in particular for liquid samples. Such samples can be liquid samples comprising cells in an aqueous solution, e.g. a buffer or a cell culture medium; any body fluid or mixtures of body fluids, e.g. blood (whole blood or selectively purified blood portions), serum, plasma, cerebrospinal liquids (liquor), urine, sperm, lymph, tear fluid, saliva, sputum, exsudate, ascites, or dissociated cells from any solid tissue, i.e. tumor tissue; an environmental water sample; food or beverage sample or similar. According to the invention samples of interest are such samples comprising cells, in particular human or animal cells, e.g. mammal or insect cells; plant cells; microorganisms, e.g. bacteria, yeast, protists, algae or fungi.

Preferred biological samples are selected from such comprising cells including biomolecules, for example nucleic acids, such as RNA, in particular mRNA, siRNA, miRNA, snRNA, tRNA, hnRNA or Ribozymes, DNA, in particular genomic, plasmid or organelle DNA, synthetic or modified nucleic acids or PNAs (peptide nucleic acids); proteins or oligopeptides, in particular enzymes, hormones, growth factors; or other biomolecules of interest.

The samples furthermore can comprise viruses, viroids, prions, lipids, carbohydrates, oligosaccharides, polysaccharides, proteoglucanes, fecal matter, scurf, hair, skin fragments, metabolic products, organella, for example chloroplasts or mitochondria, vesicles or similar.

Cells may be comprised in the sample as single cells, cell agglomerates or in tissue/tissue fragments or mixtures of any of those. Preferred samples are such comprising cell suspensions and/or small tissue fragments, e.g. fine needle aspirates from the aspiration of organs, or lavage of body cavities. As mentioned above fine needle aspiration is a minor invasive diagnostic procedure used to investigate biological samples of liquid and tissue/cells. In this technique a thin, hollow needle is inserted into the mass for sampling of cells. Fine needle aspirates often consists of a mixture of tiny tissue samples and single cells in body fluid like lymph or blood. Any samples obtainable by fine needle aspiration are preferred according to the present invention, wherein samples of a mammal body are particularly preferred. Such samples can include, but are not limited to samples of thyroid, lymph node, pancreas, breast, lung, liver, superficial (just under the skin) lumps or masses, liquor, brain, spleen, stomach, heart, intestine, gall bladder, urinary bladder, kidney, muscle tissue, connective tissue. All common handling steps or features of fine needle aspiration, e.g. such as explained above in the introducing part of the present application, can be carried out according to the present invention.

Cells may be isolated by enzymatic and/or mechanical disaggregation. Cell suspensions may be used which were cultured as living cells for maintenance or propagation before preservation and/or storage. Before being contacted with the fixation solution cells of the sample may be washed and/or collected e.g. by centrifugation into a pellet or any other commonly known means, they may be collected on a slide or other substrate.

For blood and other single-cell suspensions, cells may be concentrated or collected by sedimentation or density gradient centrifugation, panning on a coated or uncoated plastic plate or a combination thereof. Preferably the cells are cells of a human or animal body comprised in a fine needle aspirate, which may be cancerous (benign or malignant) or precancerous, obtained from an animal or human subject affected by disease or suspected of same (normal or diseased), or be affected by other pathology. Thus, the cells in particular supposed to be stabilized, stored and/or treated preferably mainly originate from the body they are taken from. Yet, this, does not exclude that there may be cells additionally contained in the sample that are originating from other sources than the body they are taken from, e.g. microorganisms or viruses. The cells may be obtained by autopsy or biopsy (e.g., catheterization or phlebotomy) or other fluid collection. Cells, in particular either pre-collected or still within the sample, preferably are contacted with the fixative composition within one to 30 min after removal from the body or in vitro culture, but this time may be extended by cooling them on ice. Further, cells might be used which were preserved and/or stored, however this is less desirable.

A part of the sample either before contacting with the fixative composition or after fixation or both may be processed for cytology. Before fixation a part of the sample may be smeared on a slide and examined with a microscope with or without staining. Antigens or antibodies, directly or indirectly labelled with a colorimetric, enzymatic, fluorescent, luminescent, magnetic, or radioactive moiety which is detectable, can be contacted with the sample cells even after contact with the fixative composition. Cells may be identified and/or isolated in accordance with antigen expression by antibody panning or sorting, or other affinity chromatography before or after contact with the fixative composition. A cytometer may analyze or a cell sorter may separate such cells by DNA/RNA content, size, viability, binding of fluorescent-labelled antibody, or a combination thereof. A magnet may affinity purify cells that bind an antibody-coated magnetic bead. Cells may be characterized by cell cycle, division, growth, or organelles. Negative or positive selection (e. g. affinity or sorting techniques) may be used to isolate cell populations.

The cells can furthermore be stored in the sample after contact with the fixation composition. The cells can be stored for hours, or even days without essential degradation of the cell morphology and content of biomolecules. Storage of the fixed samples can be carried out at room temperature (20° C.±3° C.) for more than one hour up to about seven days or up to 14 days at lower temperature, e.g. 10 to 4° C.

Thus, according to the invention a method for treatment of a cell-comprising liquid sample is provided, comprising the steps:

a) collecting a liquid sample b) contacting at least a part of said liquid sample with a fixative composition as described before c) mixing the sample of step b)

d) optionally storing the sample.

By this method the cells comprised in the liquid samples are fixed, thus, maintaining the cell morphology of said cells as well as their content and integrity of the comprised biomolecules.

In step a) the liquid sample is collected. Said collection can be carried out by any method known in the art, but is preferably done by drawing the liquid sample into a syringe or a pipette.

Between step a) and step b) a part of the sample can be released (e.g. the sample is divided), e.g. smeared on a slide or transferred in another container for further examination of the sample contents.

In step b) at least a part, e.g. the remainder of the liquid sample, is contacted with the fixative composition as described above. This can be done e.g. by injecting the sample into the fixative composition comprised in an container.

For fixation of the cells in the liquid sample said liquid sample is contacted with the fixative composition in a ratio of from 1:10 to 1:1000 wherein any ratio within the cited range can be used, e.g. 1:20, 1:30, 1:40, 1:50, 1:60, 1:70, 1:80, 1:90, 1:100, 1:125, 1:50, 1:175, 1:200, 1:250, 1:300, 1:400, 1:500, 1:600, 1:700, 1:800, 1:900 or ratios therebetween. A preferred range is from 1:20 to 1:50.

Accordingly it is preferred that the concentration of the components i) to iv) in the final sample composition (the combination of the liquid sample and the fixative composition) is at least 27.3% of the alcohol component i), at least 1.82% of the acid component ii), at least 9% of the hydroxyl compound iii) and at least 15% of water. The concentrations of each of the components can be calculated by considering the concentration ranges defined above for each of the components and the ratios for combining the liquid sample with the fixative composition.

In step c) the final sample composition is mixed. Said mixing can be carried out e.g. by turning the container comprising the composition or by vortexing, pipetting up and down or by shaking, without being restricted thereto.

According to step d) the final sample composition can optionally be stored as described above at room temperature (20° C.±3° C.) for minutes, hours or up to seven days or at lower temperature, e.g. 10 to 4° C. The final sample composition can be stored for hours, or even days without essential degradation of the cell morphology and content of biomolecules in the comprised cells.

Either directly after mixing the final sample composition or after storing the cells comprised in the sample can be further treated or investigated. Therefore at least a part of the final sample composition after step c) or step d) is further treated by at least one of the following methods: cytological investigation, biomolecule isolation and/or embedding of the cells with an embedding material. Cytological investigation might comprise cell sorting, cytocentrifugation, smearing, membrane filtration, cell staining, dissection, hybridization or immuno-histochemistry and microscopy; biomolecule isolation may comprise the isolation of at least one of nucleic acids, proteins, peptides or peptide-nucleic acids, wherein one species of the indicated biomolecules may be isolated as a mixture or separately (e.g. nucleic acids may be isolated as a mixture of DNA and RNA or DNA and RNA may be isolated separately and even various kinds of one nucleic acids may be separated, like small RNA from larger RNA); infiltration or embedding of the cells might be carried out by contacting the cells with at least one of paraffin, mineral oil, non-water soluble waxes, celloidin, polyethylene glycols, polyvinyl alcohol, agar, gelatine, nitrocelluloses, methacrylate resins, epoxy resins, or other plastic media. For all these methods the cells might be concentrated or collected before the treatment, if desired, e.g. by centrifugation or filtration.

In a preferred embodiment of the present method more than one of said treatment or investigation methods are carried out with aliquots of the sample. For example the final sample composition comprising the cells of interest can be divided in several aliquots and one aliquot is investigated by any commonly known cytological method, a further aliquot is used for isolation of (a) biomolecule(s) of interest, and a third aliquot is used for embedding of the cells in a suitable embedding material. Of course as well only one or two aliquot(s) might be removed for further examination, wherein the remainder of the final sample composition is stored. An exemplified method for treatment of a collected sample including further treatment of the final sample composition is shown in FIG. 1.

For the before mentioned treatment or investigation methods any known method can be used without limiting the invention. For example any suitable cell staining agent can be used to stain the cells, any suitable nucleic acid probe or any antibody can be used for hybridisation or immunohistchemistry, any known nucleic acid isolation method can be carried out and/or any technique suitable for embedding or infiltration of the cells of the sample can be used.

According to the present invention a kit can be provided including solutions, compositions, means and/or devices usable in the presently described methods.

Accordingly such a kit comprises at least a fixative composition as described above. Further, said kit can comprise at least one of the following ingredients:

A) means for collecting a liquid sample, preferably a syringe, a tube, a container, a cup, needle, piercing or suction device
B) means for investigation of the cells comprised in the sample, preferably slide(s), pipette(s), membranes, filter
C) means and/or solutions for biomolecule isolation
D) means and/or solutions for cell staining
E) means and/or solutions for sample embedding or infiltration From these optional additional ingredients it is particularly preferred that, A) any means for collecting a liquid sample is comprised in the kit.

Means or solutions for biomolecule isolation according to C) might be e.g. lysis solutions for lysing the cells of the sample, solid support materials for binding either the desired biomolecules or the non-desired remainders of the sample, binding solutions allowing adaption of the sample conditions for binding of the desired/non-desired compounds in the sample to the solid support material, washing solutions for washing the desired biomolecules or any other suitable means.

Means or solutions for cell staining according to D) are in particular solutions for pre-treating the cells for staining and/or staining solutions i.e. dyes for conventional cytological stainings or antibodies for immuncytochemistry staining.

Means or solutions for sample embedding or infiltration according to E) are in particular embedding materials as mentioned above, like e.g. at least one of paraffin, mineral oil, non-water soluble waxes, celloidin, polyethylene glycols, polyvinyl alcohol, agar, gelatine, nitrocelluloses, methacrylate resins, epoxy resins, or other plastic media, and optionally a mould for forming the desired shape.

On the other hand the means B), C), D) and E) as well might be outside of the kit of the present invention, however said means are used in combination with the fixative or the fixed biological sample of the present invention, respectively. For example the means and/or solutions for biomolecule isolation C) or means and/or solutions for cell staining D) can be some known and offered for said isolation or staining methods in the market.

Accordingly it should be understood that it is as well encompassed in the present invention that a sample fixed with the fixative composition of the present invention is used for further investigation, e.g. biomolecule isolation, sample/cell staining or sample embedding or infiltration. In these methods any means or solution(s) suitable or serving as a means/solution(s) for biomolecule isolation, for sample/cell staining, embedding or infiltration can be used for further treatment of the sample. Any such further treatment using a sample formerly contacted with the fixative solution of the present invention is considered as encompassed in the present invention. Kits or solutions for biomolecule isolation, for cell staining and/or for sample embedding or infiltration are offered on the market in a huge number and in various embodiments and can be used for the further treatment of the samples of the present invention.

All the materials and methods described herein above are suitable for analysing any biological material outside of a living body by at least one, preferably more than one analysing method starting from the same sample.

FIGURES

FIG. 1: Scheme for a method for fixation, cytological staining and biomolecule purification from a liquid biological sample collected for conventional cytological examination.

FIG. 2 shows the amount of precipitation of blood proteins in different fixative solutions after storage (see Example 2).

FIG. 3: Microscopic images of tumor cells after fixation and storage in different fixative solutions (see Example 3).

Figure 11:
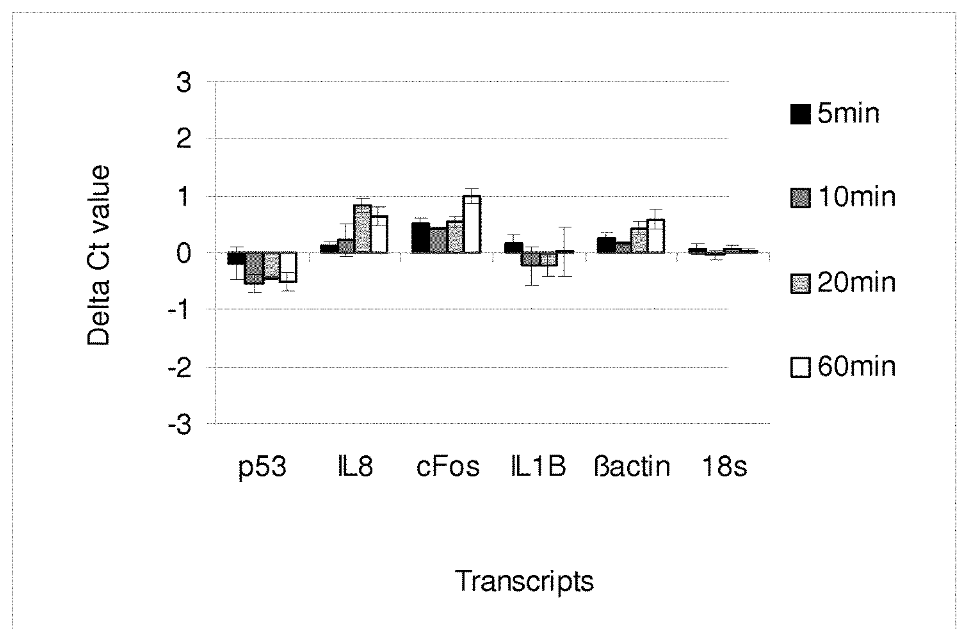

FIG. 11: ct-values of RT-qPCR for determination of transcript levels in fixed cells (see Example 11).

Figure 12:
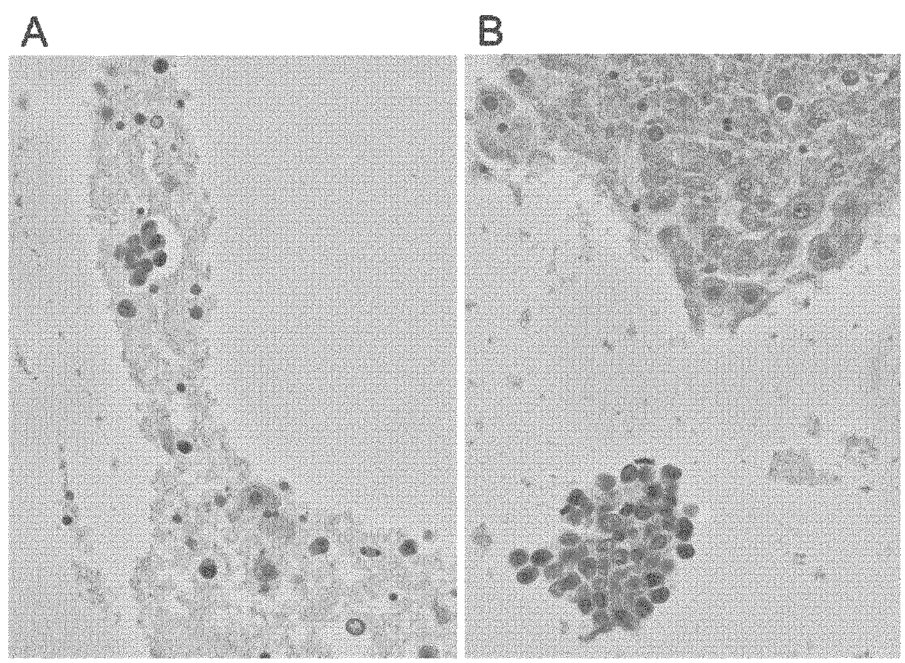

FIG. 12: Microscopic images of a mixture of tumor cells, whole blood and liver extracts after fixation and preparation of an artificial cell block (see Example 12).

EXAMPLES

The following examples are describing investigation methods and results of cell-comprising liquid samples by using the composition and methods as described herein. Said examples should be understood as illustrating the invention, however, not as limiting the invention to the particularly shown embodiments.

Experimental Procedures as Used in the Following Examples

If not otherwise described the samples of the following examples were prepared and treated as follows:

Preparation of Cells and Cell Extracts

Human ovary adenocarcinoma (SK-OV3) cells were grown as monolayers in McCoy's 5A modified medium. For harvesting, cells were washed with PBS, detached from the plate by common treatment with EDTA and resuspended in McCoy's medium. Cell number was determined by counting of cells with a Neubauer-Zählkammer. Cells were further diluted with medium to reach a calculated concentration, e.g. $10^6$ per ml. Aliquots of cells, e.g. 1 ml were centrifuged and the pellet was resuspended in a volume of liquid, e.g. 100 μl medium, whole blood or blood plasma, to receive a calculated number of cells, e.g. $10^6$ cells in a liquid for subsequent fixation with the liquid fixative composition.

Preparation of Rat Tissue Extracts:

Directly after resection a rat tissue was squeezed through the grids of a standard biopsy cassette and gently mixed with 150 μl PBS (phosphate buffered saline). Alternatively tissue was chopped into tiny pieces.

Cytological Staining:

Up to 1 ml of the final sample composition (mixtures of FNA-fixative and the biological material comprising sample) were filled in an EZ Funnel and directly centrifuged onto a microscopic slide with a Cytospin 4 cytocentrifuge (Shandon). Slides were airdried for a few seconds and used for staining according to Papanicoloau (1 min nuclei staining with Papanicolaou Hematoxylin, 3 min keratin staining with Papanicolaou Lsg OG6 (2a) and 3 min cytoplasma staining with Papanicolaou Lsg EA50) or by H&E staining (30 sec hematoxylin and 1 min eosin) using kits or staining reagents from Merck.

RNA Extraction from Fixed Samples:

Up to 1 ml of the final sample composition were centrifuged. The pellets were resuspended with RNeasy Lysis buffer RLT and homogenized with a QIAShredder. After adjusting binding conditions with ethyl-alcohol the lysates were loaded on RNeasy mini columns, and RNA was bound to the silica membrane of the columns by centrifugation. After several washing steps and optional on column digestion with DNase, the RNA was eluted with water.

Processing and Paraffin Embedding of Solid Tissue Fixed with FNA-Fixative:

Rat tissue was cut into tiny pieces with a maximum thickness of 1-2 mm. Fixation was performed in biopsy-cassettes. Processing was performed on a Leica TP1020 automated processor (Leica, Wetzlar, Germany) by incubation in 80%, 90%, 99% (two times) ethanol, followed by isopropanol (two times), xylene (two times), xylene mixed 1:1 with low melting paraffin, infiltration and embedding in low melting paraffin. Sections with 4 μm thickness were mounted on slides, deparaffinised, rehydrated and stained for microscopic analysis Preparation of Cell Blocks:

Aliquots of 1 ml of the final sample composition (mixture of FNA-fixative and the sample comprising biological material) were centrifuged. The resulting pellet was mixed with a drop of melted agarose (5% low melting ultra-pure agarose from live technologies) i.e. approximately 50-100 μl. After hardening the agarose block with the enclosed biological material was transferred into a standard cassette, processed and paraffin embedded as described above, sectioned and stained with H&E.

Example 1

Figure 1:
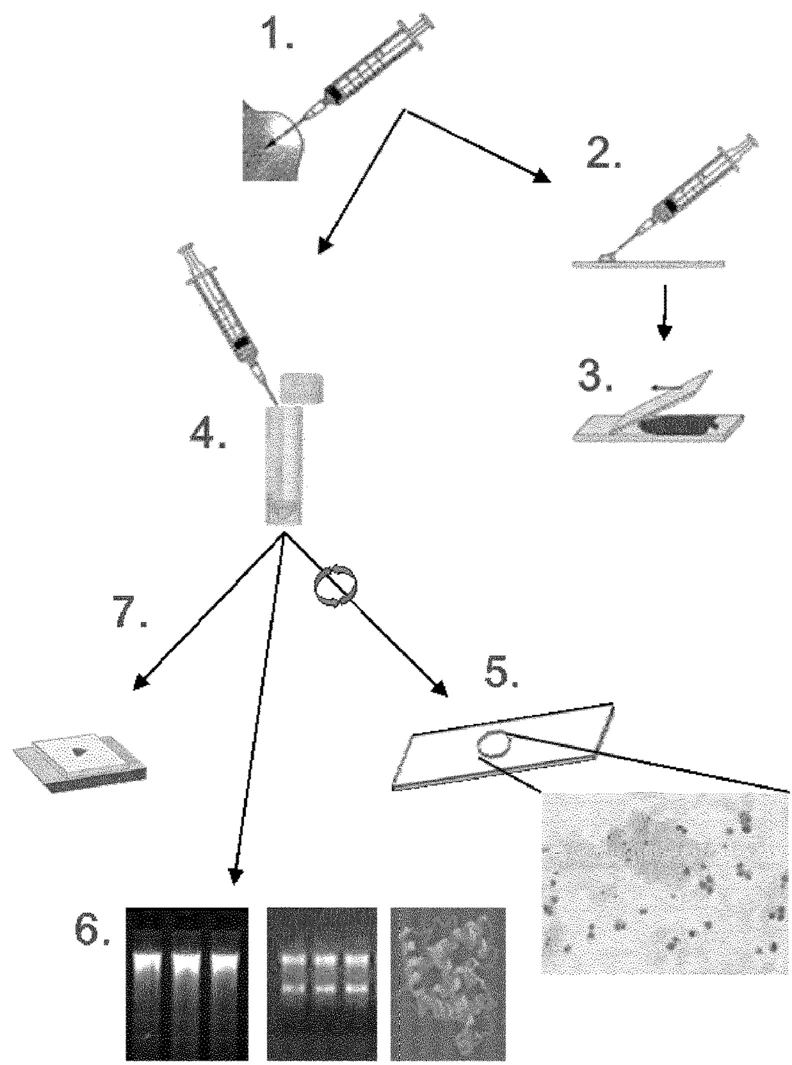

Example 1 describes a possible handling of a sample with several analysing methods as shown in FIG. 1

Method Description:

After a fine needle aspiration specimen was collected into a syringe and smears on slides were prepared for air drying or alcohol fixation followed by cytological staining, the residual sample was directly dispensed into a tube containing the fixative composition according to the invention, for preservation of cell morphology and biomolecules. The biological sample was mixed with the fixative composition by inverting the tube 10 times or by a short vortexing step. By working this way fixation with the molecular friendly new fixative does not interfere with conventional diagnostics.

Nucleic acids, proteins and cell morphology of the biological sample were stable at room temperature. Fixed specimens can be transported and/or stored for days in the tube. Aliquots can be centrifuged onto microscopic slides using a cytofuge for cytological staining. Alternatively or in addition aliquots can be centrifuged and the resulting cell pellets can be processed and paraffin embedded for preparation of cell blocks. RNA, DNA, or total RNA including miRNA can be purified using dedicated protocols with buffers, e.g. from the RNeasy and QIAamp product line.

Protocol overview (Scheme see FIG. 1):

1. Collect FNA specimen.
2. Dispense adequate sample of aspirate onto slides.
3. Prepare smears, air dry or fix with alcohol and stain for conventional cytological examination.
4. Dispense residual FNA specimen into a tube or container, filled with the fixative composition for preservation of cell morphology and biomolecules in the liquid biological sample. Transport and/or store the fixed FNA specimen.
5. Perform cytocentrifugation of an aliquot of the fixed FNA sample, and stain for cytology examination.
6. Extract biomolecules from another aliquot.

7. Optional: use aliquots for preparation of paraffin embedded cell blocks

Example 2: Precipitation of Blood Proteins in Different Fixatives

Figure 2:
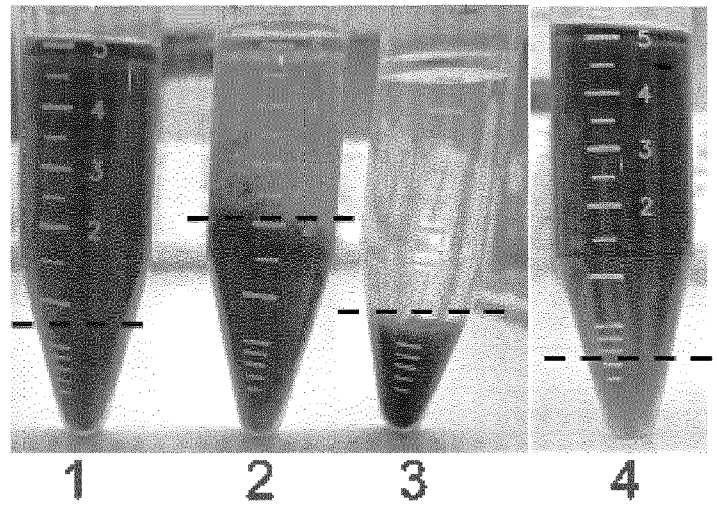

In a 15 ml falcon tube 5 ml fixative solutions (1-4) were mixed with 100 μl human whole blood and the mixture was stored undisturbed at room temperature. The fixative compositions were as follows:

(1) PAXgene Tissue Fix (PreAnalytics)
(2) PreservCyt (Cytyc)
(3) 95% Ethanol p.a.
(4) fixative composition according to the invention: 50% EtOH, 6% acetic acid, 20% DEGMEA, ad 100% $ddH_2O$ Composition (1) gave a 500 μl brown pellet after 24 hours, compostion (2) a 2 ml brown pellet after 24 hours, composition (3) a 500 μl solid, red pellet after 24 hours and composition (4) a 200 μl white pellet after 4 days. The results are shown in FIG. 2.

Example 3: Effect of Blood Protein Precipitates on Cytological Staining

Figure 3:
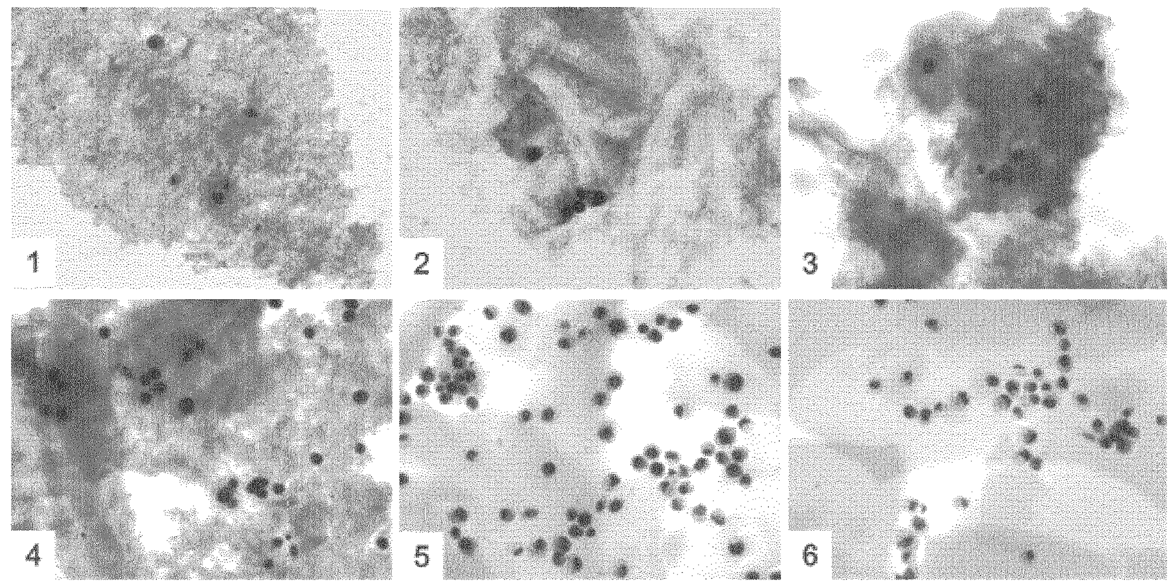

In cups 1 ml of a fixative composition (1-6), respectively, were mixed with 50 μl of human plasma from whole blood and $2\times10^5$ cultured human ovary adenocarcinoma (SK-OV3) cells; after 24 hours at room temperature, centrifugation with cytospin centrifuge on microscopic slide and staining according to Papanicolaou was carried out. In FIG. 3 the cells are shown with 400 fold original magnification. Fixative compositions used: (1) Surepath (BD), (2) PreservCyt (Cytyc), (3) 95% Ethanol p.a., (4) PAXgene Tissue FIX (PreAnalytics), (5) fixative composition according to invention (60% [v/v] Ethanol, 10% [v/v] acetic acid, 20% [v/v] ethylene glycol, ad 100% with $ddH_2O$), (6) fixative composition according to invention (60% [v/v] Ethanol, 10% [v/v] acetic acid, 10% [v/v] ethylene glycol, ad 100% with $ddH_2O$).

With compositions (1)-(4) tumor cell morphology was obscured by precipitated plasma proteins. Distinction between cytoplasma and nuclei was hardly possible, due to heavy shrinkage of cytoplasmic parts. Cell nuclei appeared condensed, chromatin structure was unrecognizable.

With compositions (5)-(6) plasma proteins formed a thin layer which didn't obscure cell morphology. Cytoplasma and nuclei were intact, the chromatin structure was intact with nucleoli and metaphase chromosomes were clearly identifiable. Results are shown in FIG. 3.

Example 4: Morphology and RNA Preservation of Tumor Cells in a Liquid Sample Mixed with Fixative Compositions According to the Invention Containing Different Components (iii)

Cell pellets of $10^6$ cultured human ovary adenocarcinoma (SK-OV3) cells were resuspended with 100 μl of cell culture media, mixed with 4 ml of fixative compositions according to the invention containing different components (iii) as described below as (1)-(11) and stored for 4 days at room temperature. Aliquots of 100 μl each were centrifuged on a microscopic slide with a cytocentrifuge and stained according to Papanicolaou (shown in FIG. 4 with 1000 fold original magnification). Furthermore aliquots of 1 ml each of the same final sample compositions were centrifuged, the pellet resuspended in lysis buffer and the RNA extracted as described above. RNA was analysed on an Agilent Bioanalyzer (gel images shown for three independent replicates, on the right side of the cell images, respectively).

Figure 4:
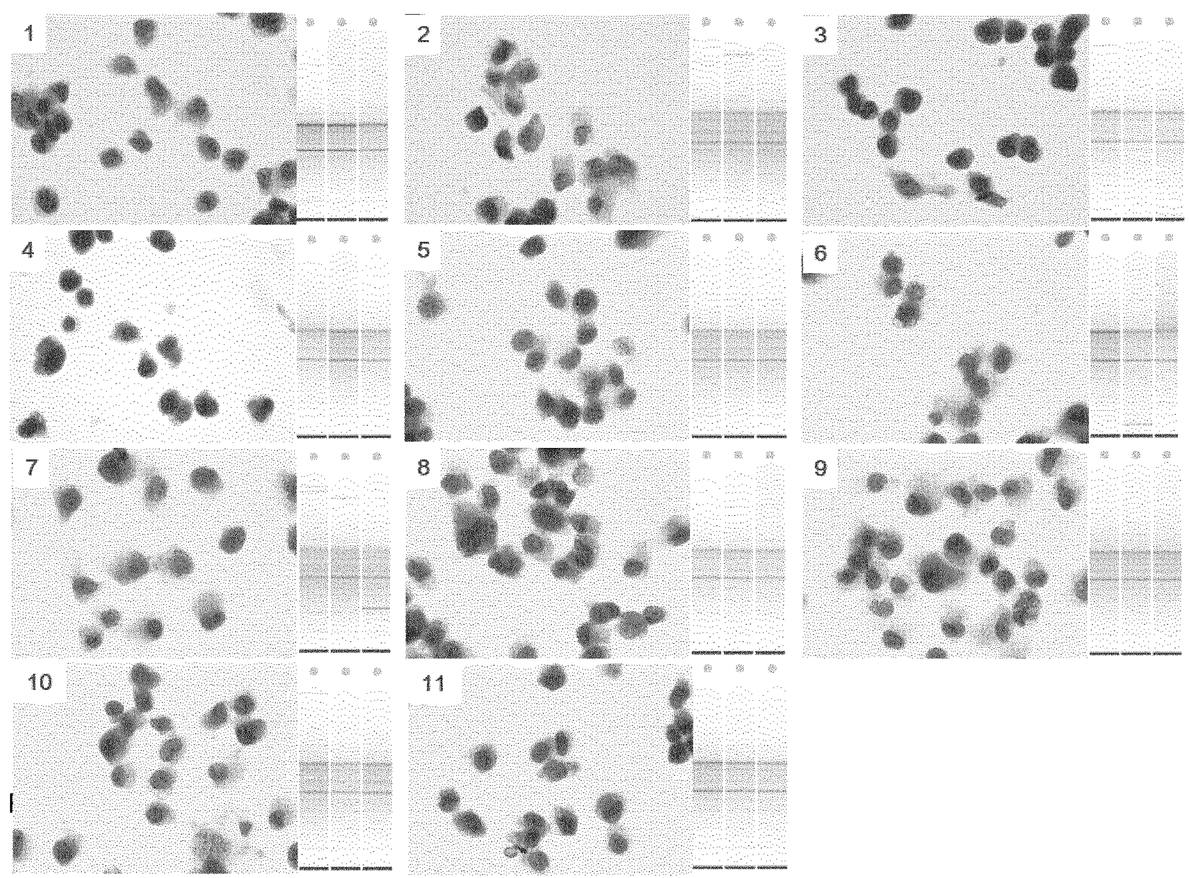
FIG. 4 shows the morphology of cells fixed in fixative compositions according to the present invention varying in component (iii) and RNA isolated from said fixed cells (see Example 4).

In compositions (1)-(11) the fixative compositions were composed of 50% [v/v] Ethanol, 10% [v/v] acetic acid, 20% [v/v] water, and 20% [v/v] additional component (iii), pH unadjusted. The following additional components (iii) were used: (1) diethylene glycol monoethyl ether acetate, (2) glycerine, (3) polyethylene glycol 200, (4) polyethylene glycol 300, (5) hexane triol, (6) diethylene glycol monoethyl ether, (7) 2,3-butanediol, (8) 1,3-propanediol, (9) 2-methyl-2,4-pentanediol, (10) dipropylglycol, (11) 1,3-butanediol. As can be seen in FIG. 4 the morphology of tumor cells was well preserved. Cytoplasma and nuclei were visible. Within the nuclei chromatin structures like nucleoli and metaphase chromosomes can be identified. RNA from extracts of fixed cells was of high quality after 4 days storage at ambient temperatures. Distinct bands for the ribosomale 18s and 28s rRNA can be seen on the gel images, generated by the Agilent Bioanalyzer, indicating high molecular weight RNA.

Example 5: Comparison of Morphology and RNA Preservation of Tumor Cells Mixed with Human Plasma and Fixative Compositions Containing Different Volumes of Alcohol, Water and Acid Cell pellets of $2\times10^5$ cultured human ovary adenocarcinoma (SK-OV3) cells were resuspended with 50 μl of human plasma, mixed with 1 ml of fixative compositions (1)-(7) having different amounts of alcohol, water and acid and stored at ambient temperature. After 1 hour storage replicates were centrifuged on a microscopic slide with a cytospin and stained according to Papanicolaou (shown in FIG. 5 with 400 fold original magnification); independently replicates were stored for 6 days, centrifuged, pellets were resuspended in lysis buffer and the RNA was extracted as described above. RNA was analysed on Agilent Bioanalyzer (gel images shown for two independent replicates in FIG. 5).

Figure 5:
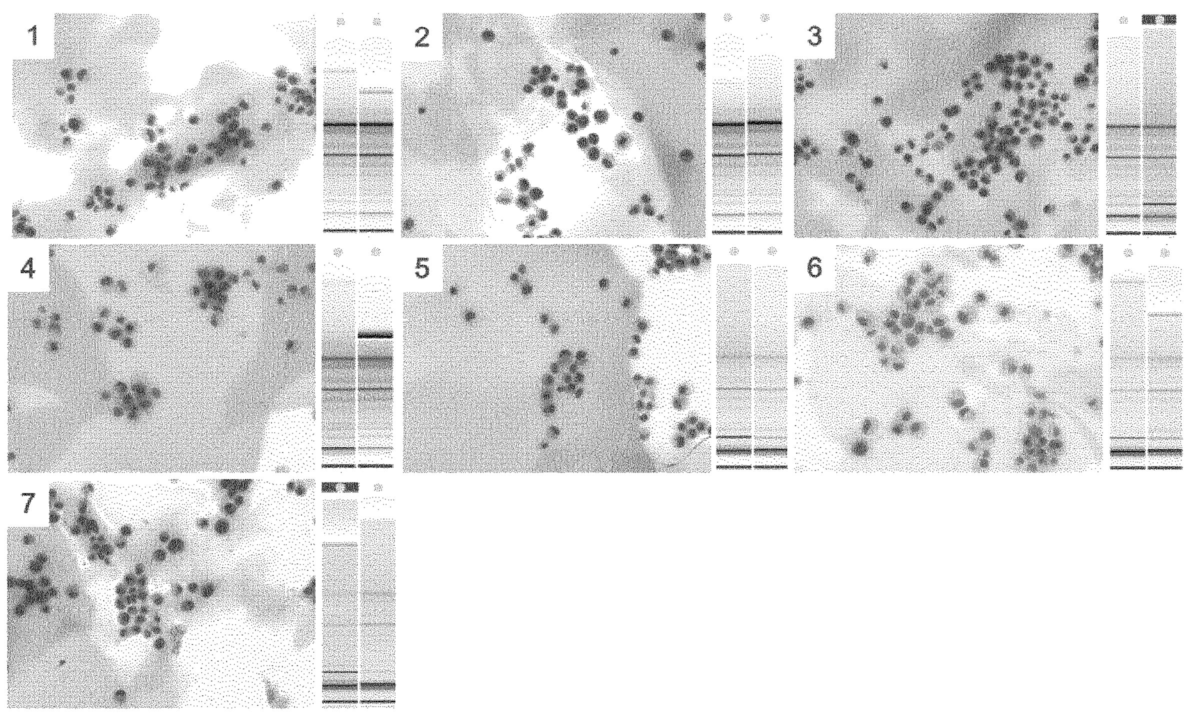
FIG. 5 shows the morphology of cells fixed in fixative compositions according to the present invention varying in contents of components (i), (ii) and (iv) and RNA isolated from said fixed cells (see Example 5).

(1) 60% [v/v] Ethanol, 10% [v/v] acetic acid, 20% [v/v] water, and 10% [v/v] ethyleneglycol
(2) 60% [v/v] Ethanol, 10% [v/v] acetic acid, 10% [v/v] water, and 20% [v/v] ethyleneglycol
(3) 60% [v/v] Ethanol, 10% [v/v] acetic acid, 30% [v/v] ethyleneglycol
(4) 60% [v/v] Ethanol, 15% [v/v] acetic acid, 10% [v/v] water, and 15% [v/v] ethyleneglycol
(5) 60% [v/v] Ethanol, 15% [v/v] acetic acid, and 25% [v/v] ethyleneglycol
(6) 70% [v/v] Ethanol, 15% [v/v] acetic acid, and 15% [v/v] water
(7) 70% [v/v] Ethanol, 15% [v/v] acetic acid, and 15% [v/v] ethyleneglycol As can be seen in FIG. 5 morphology of tumor cells was well preserved in all samples. Plasma proteins from whole blood were visible as a thin layer but didn't obscure the cell morphology. Cytoplasma and nuclei were intact, and chromatin structures like nucleoli and metaphase chromosomes can be identified.

In samples 1 and 2 RNA from extracts of fixed cells and plasma was of high molecular weight after 6 days storage at ambient temperatures, as indicated by distinct bands for the ribosomale 18s and 28s rRNA on the gel images, generated by the Agilent Bioanalyzer.

Figure 6:
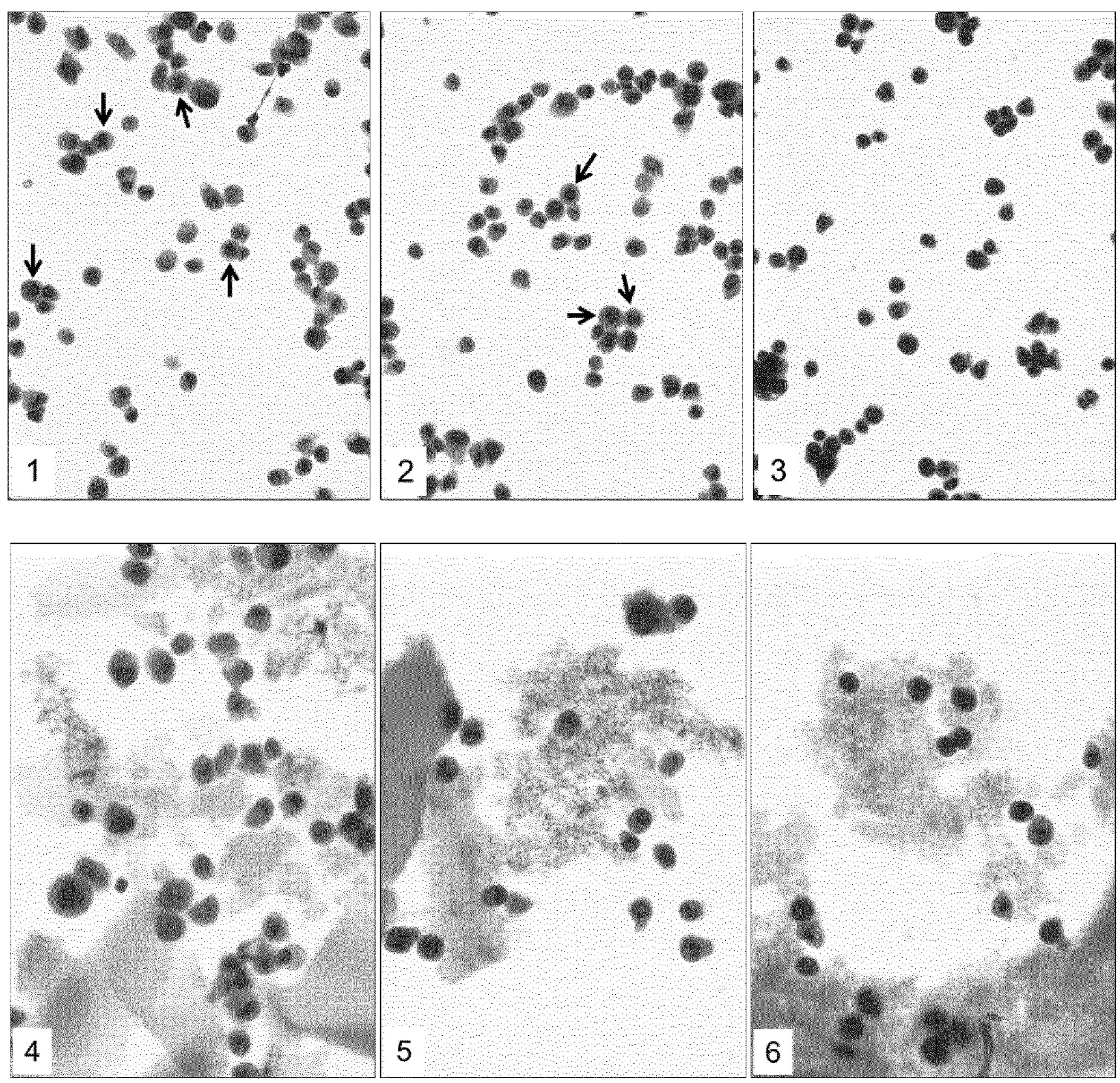
FIG. 6 shows the morphology of cells fixed in fixative compositions according to the present invention varying in final concentration of acid (see Example 6).

Example 6: Effect of Acid Concentration in Fixatives According to the Invention on Cell Cytology Preservation and Staining Cell pellets of $10^6$ cultured human ovary adenocarcinoma (SK-OV3) cells were resuspended with 50 µl of cell culture media, mixed with 4 ml of fixative compositions according to the invention containing different components as described below as (1)-(3) either without (FIG. 6: 1-3) or with addition of 40 µl human plasma and 8 µl human whole blood (FIG. 6: 4-6). Mixtures of cultured cells and fixative or cultured cells, plasma, whole blood and fixative were stored for 7 days at room temperature. After storage aliquots of 1 ml each were centrifuged on a microscopic slide with a cytocentrifuge and stained according to Papanicolaou (FIG. 6: 1-6) with 400 fold original magnification).

(1) 50% [v/v] Ethanol, 10% [v/v] acetic acid, 20% [v/v] water, and 20% [v/v] diethylene glycol monoethyl ether acetate (2) 50% [v/v] Ethanol, 5% [v/v] acetic acid, 25% [v/v] water, and 20% [v/v] diethylene glycol monoethyl ether acetate (3) 50% [v/v] Ethanol, 2% [v/v] acetic acid, 28% [v/v] water, and 20% [v/v] diethylene glycol monoethyl ether acetate In case of compositions (1)-(2) the tumor cell morphology was well preserved. Cytoplasma could be distinguished from the nuclei. Within the nuclei localization of the nucleolis was possible. Mitotic cells could be easily identified (indicated in FIG. 6, 1 and 2 with arrows). In contrast in case of the composition (3) with a significant lower concentration of acid, chromatin in tumor cells appeared to be condensed. Overall staining of the cells was darker, less details could be seen which rendered identification of mitotic cells difficult. In addition cells appeared to be shrinked and to have a reduced fraction of cytoplasma compared to cells fixed with compositions (1)-(2).

Another difference became apparent, when human plasma and whole blood were added to the mixture of cells and fixative in order to mimic a fine needle aspirate. In case of compositions (1)-(2) human plasma formed a thin layer which didn't obscure cell morphology (FIGS. 6: 4 and 5). Red blood cells could be seen as empty shells. Cytoplasma and nuclei of tumor cells were still intact, chromatin structure appeared differentiated with nucleoli and metaphase chromosomes identifiable. In contrast with composition (3) including reduced amount of acid the human plasma proteins seemed to be precipitated, red blood cells were destroyed and tumor cells shrinked with a reduced fraction of cytoplasma (FIG. 6: 6).

Example 7: Morphology and RNA Preservation of Tumor Cells Mixed with Human Whole Blood with Fixative Compositions According to the Invention with Different Amounts of Water and Acid 5 ml of different fixative compositions (1)-(6) according to the invention were mixed with $10^6$ cultured human ovary adenocarcinoma (SK-OV3) cells and 100 µl of human whole blood, respectively. The mixtures of fixed cells and blood were stored at ambient temperatures for 7 days. Aliquots of 100 µl each were centrifuged on a microscopic slide with a cytocentrifuge and stained according to Papanicolaou (shown in FIG. 7 with 400 fold original magnification); further aliquots of 1 ml were centrifuged, the pellet resuspended in lysis buffer and the RNA extracted as described above. RNA was analysed on Agilent Bioanalyzer (gel images shown for three independent replicates in FIG. 7).

Figure 7:
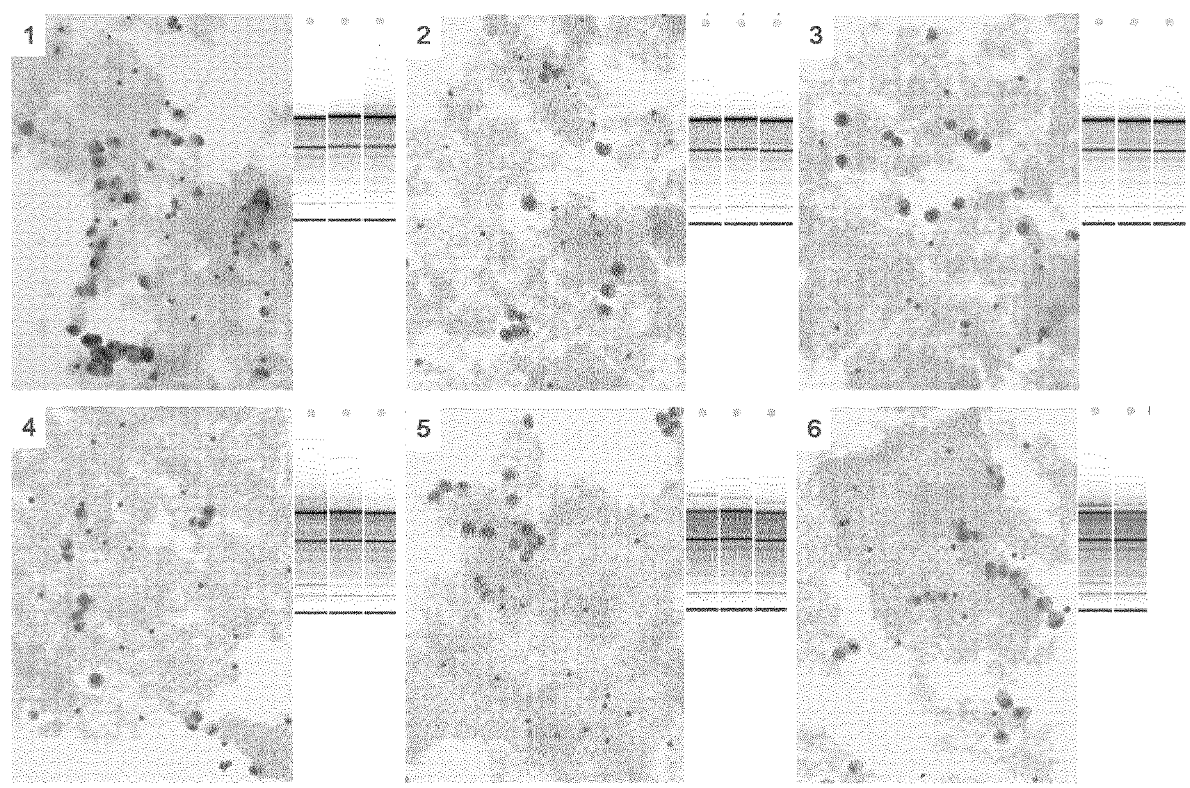
FIG. 7 shows the morphology of cells fixed in fixative compositions according to the present invention varying in contents of components (ii) and (iv) and RNA isolated from said fixed cells (see Example 7).

(1) 25% [v/v] water, 6% [w/v] acetic acid, 20% [v/v] diethylene glycol monoethyl ether acetate, ad 100% [v/v] ethyl alcohol (2) 25% [v/v] water, 6% [w/v] acetic acid, 25% [v/v] diethylene glycol monoethyl ether acetate, ad 100% [v/v] ethyl alcohol (3) 20% [v/v] water, 6% [w/v] acetic acid, 25% [v/v] diethylene glycol monoethyl ether acetate, ad 100% [v/v] ethyl alcohol (4) 20% [v/v] water, 10% [w/v] acetic acid, 20% [v/v] diethylene glycol monoethyl ether acetate, ad 100% [v/v] ethyl alcohol (5) 25% [v/v] water, 10% [w/v] acetic acid, 20% [v/v] diethylene glycol monoethyl ether acetate, ad 100% [v/v] ethyl alcohol (6) 25% [v/v] water, 10% [w/v] acetic acid, 15% [v/v] diethylene glycol monoethyl ether acetate, ad 100% [v/v] ethyl alcohol As can be seen in FIG. 7 morphology of tumor cells and white blood cells was well preserved with cytoplasma, nuclei and chromatin structure visible. White blood cells can be distinguished from the tumor cells and red blood cells were visible as empty shells. Red blood cells as well as plasma proteins did not obscure the morphology of the tumor cells. RNA from extracts of fixed cells and whole blood was of high molecular weight after 7 days storage at ambient temperatures, as indicated by distinct bands for the ribosomale 18s and 28s rRNA on the gel images, generated by the Agilent Bioanalyzer (see FIG. 7).

Example 8: Morphology and RNA Preservation in a Mixture of Tumor Cells and Whole Blood, Fixed with Fixative Compositions According to the Invention Having Different pH 5 ml of fixative compositions (1)-(3) with different pH (adjusted with sodium hydroxide) according to the invention were mixed with 100 µl human whole blood and $10^6$ cultured human ovary adenocarcinoma (SK-OV3) cells and stored for 7 days.

Figure 8:
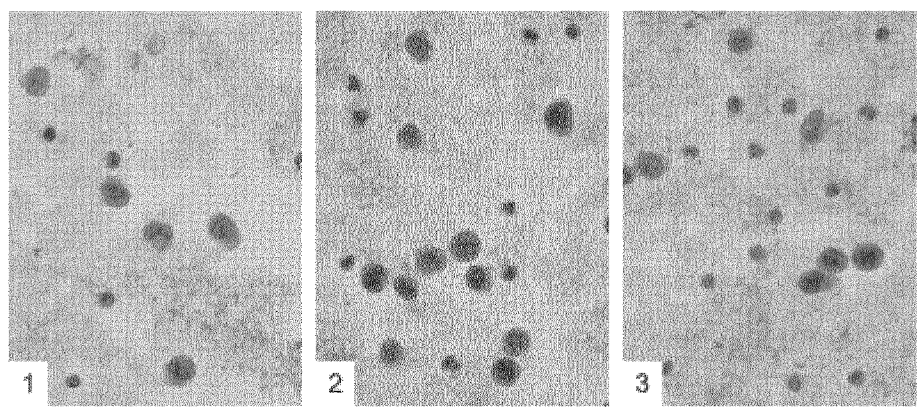
FIG. 8 shows the morphology of cells fixed in fixative compositions according to the present invention varying in pH values and RNA isolated from said fixed cells (see Example 8).
Figure 8:
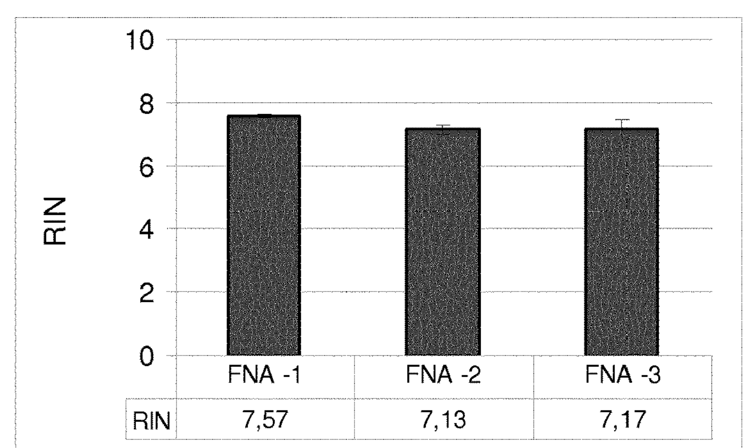
Figure 8:
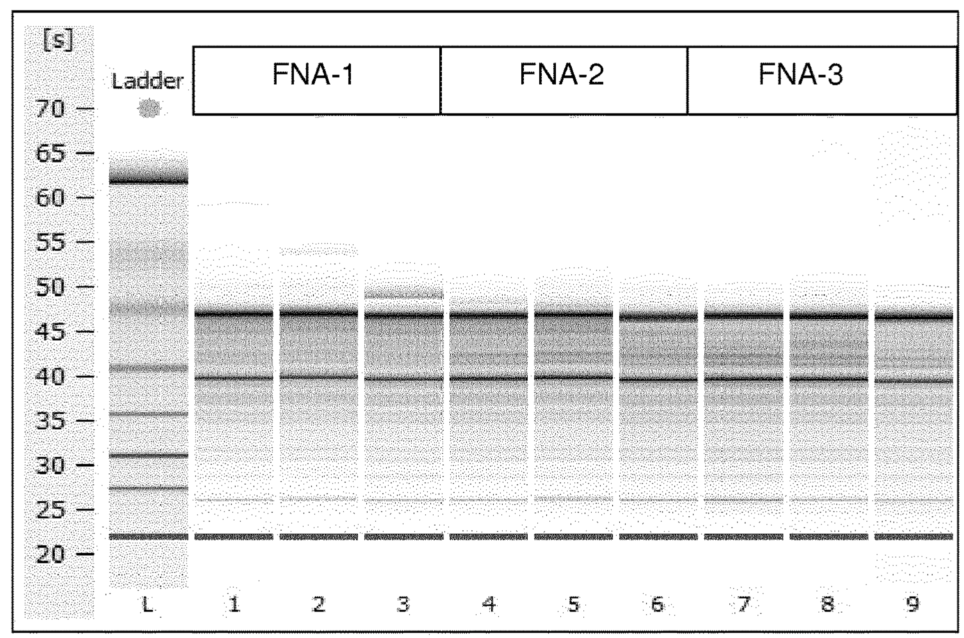

(1) "FNA-1": 50% [v/v] Ethanol, 6% [w/v] acetic acid, 20% [v/v] Diethylene glycol monoethyl ether acetate, pH unadjusted, ad 100% with $ddH_2O$ (2) "FNA-2": 50% [v/v] Ethanol, 6% [w/v] acetic acid, 20% [v/v] Diethylene glycol monoethyl ether acetate, pH3, ad 100% with $ddH_2O$ (3) "FNA-3": 50% [v/v] Ethanol, 6% [w/v] acetic acid, 20% [v/v] Diethylene glycol monoethyl ether acetate, pH3.3, ad 100% with $ddH_2O$ Aliquots of 100 µl were respectively centrifuged on a microscopic slide with a cytocentrifuge and stained according to Papanicolaou (FIG. 8A, 1000 fold original magnification); 3 replicates of 1 ml each were centrifuged, the obtained pellets were resuspended in lysis buffer RLT and the RNA was extracted as described above. RNA was analysed on Agilent Bioanalyzer (FIG. 8B).

The morphology of the tumor cells and the white blood cells was well preserved with cytoplasma, nuclei and chromatin structure visible. Different types of white blood cells, like neutrophils with multilobed nuclei can be differentiated from e.g. lymphozytes. Red blood cells are visible as empty shells.

RNA from extracts was of high quality after 7 days storage at ambient temperatures.

Example 9: Morphology and RNA Preservation in a Mixture of Tumor Cells, Whole Blood, and Rat Spleen Cell Extract Fixed with a Fixative Composition According to the Invention 5 ml of a fixative composition according to the invention (50% [v/v] Ethanol, 6% [w/v] acetic acid, 20% [v/v] Diethylene glycol monoethyl ether acetate, ad 100% with $ddH_2O$, pH unadjusted) were mixed with 50 µl rat whole blood, 100 µl rat spleen extract and $10^6$ cultured human ovary adenocarcinoma (SK-OV3) cells and stored for 7 days.

Figure 9:
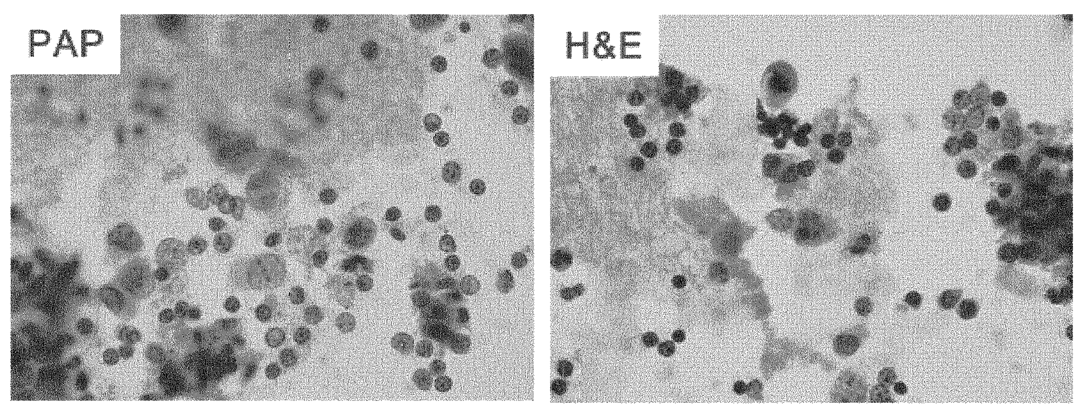
FIG. 9 shows the morphology of cells fixed in fixative compositions according to the present invention and stained by two different staining methods and RNA analysis data from RNA isolated from said fixed cells (see Example 9).
Figure 9:
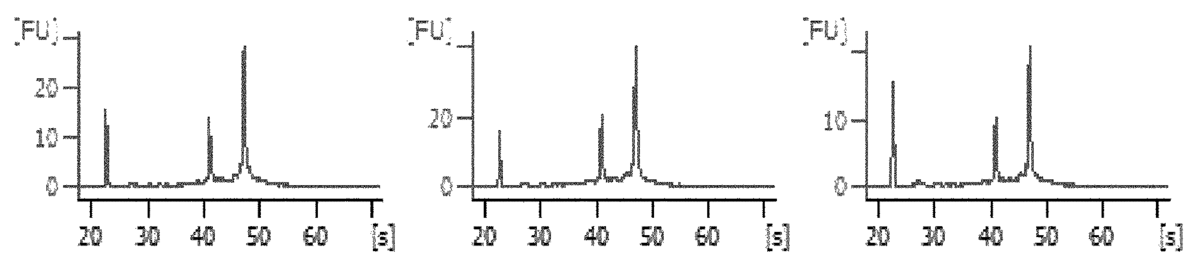

Aliquots of 100 µl each were centrifuged onto a microscopic slide with a cytospin and stained according to Papanicolaou (PAP) or with Hematoxylin and Eosin (H&E); (see FIG. 9A: 1000 fold original magnification);

3 replicates of 1 ml each were centrifuged, the pellet resuspended in lysis buffer RLT and the RNA extracted as described above. RNA was analysed on Agilent Bioanalyzer (FIG. 9B).

The morphology of tumor cells, white blood cells as well as spleen cells is preserved with cytoplasma, nuclei and chromatin structure visible. Larger tumor cells can be identified within the mixture of different cells types. Chromatin structures like nucleoli or metaphase chromosomes can be distinguished. Red blood cells were visible as empty shells. No qualitative differences seem to exist between the stainings with Papanicolaou or H&E (see FIG. 9A).

Example 10: Morphology Preservation of Solid Rat Tissue Fixed with a Fixative Composition According to the Invention in Comparison to Fixation with Neutral Buffered Formalin (NBF)

Figure 10:
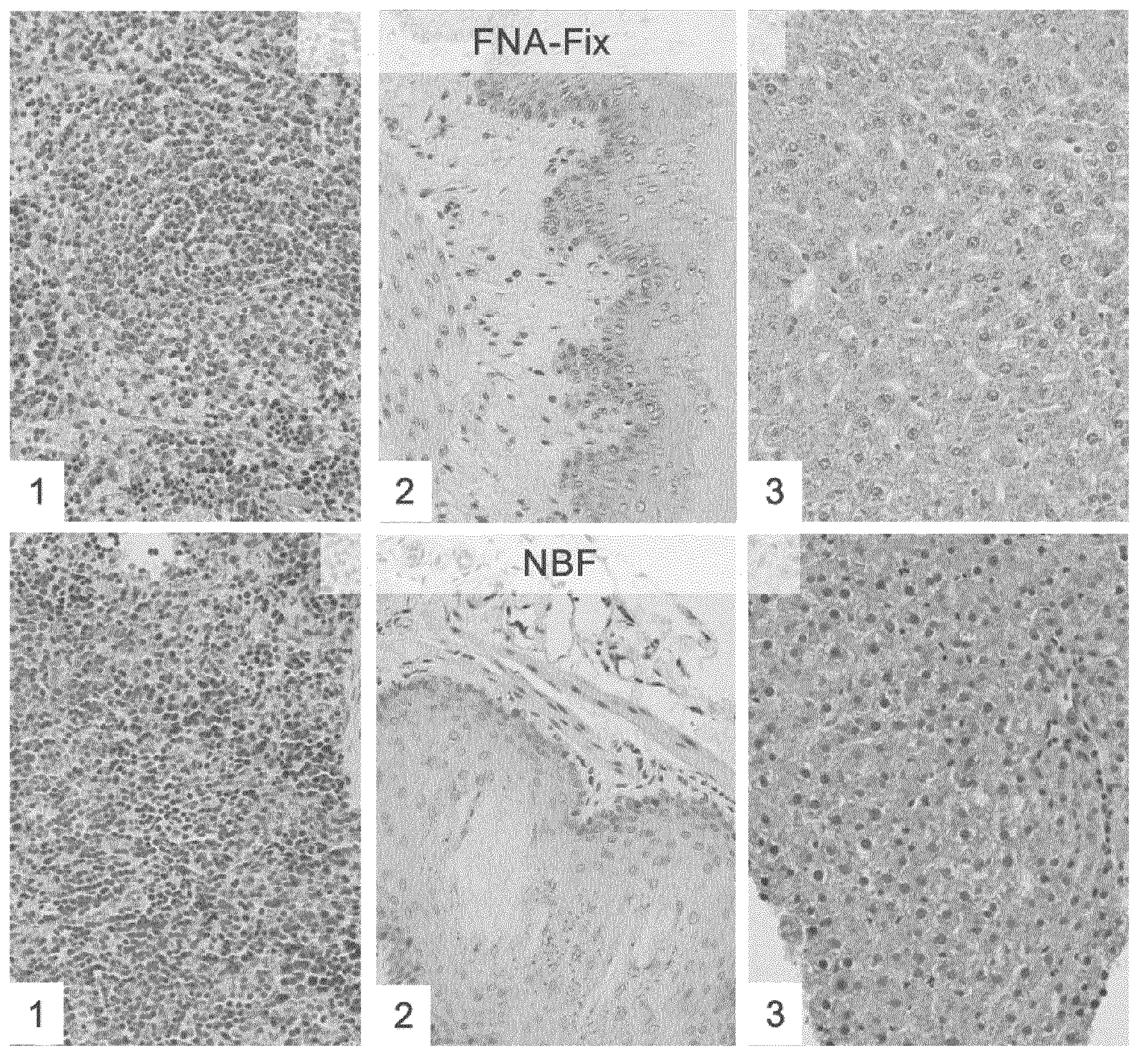
FIG. 10 shows the morphology preservation of solid tissue fixed with a fixative solution according to the present invention ("FNA-Fix") or with neutral buffered formaline ("NBF") (see Example 10).

Rat tissue (1. spleen, 2. Esophagus, 3. Intestine) was cut into small pieces with a maximum thickness of approximately 1-2 mm and fixed for 24 hours at room-temperature in 10 ml of a fixative composition according to the invention (50% [v/v] Ethanol, 6% [w/v] acetic acid, 20% [v/v] Diethylene glycol monoethyl ether acetate, ad 100% with $ddH_2O$, pH unadjusted, ("FNA-fix" in FIG. 10)) or neutral buffered formalin ("NBF"). Fixed tissue was placed into a cassette, processed and paraffin embedded on a Leica TP1020 automated tissue processor. Sections with 4 µm thickness were deparaffinized, stained with H&E and microscopically analyzed (results shown in FIG. 10, 400 fold original magnification).

Morphology preservation of different tissue types was comparable between NBF of FNA-fixative. In spleen tissue red and white pulpa can be differentiated, in esophagus the epithelial cells, different layers of smooth muscle cell and connective tissue was visible. In general morphology appeared with higher contrast and better chromatin differentiation in case of the fixative composition of the present invention was used.

Example 11: Freeze of Transcript Level in Single Cells Fixed with a Fixative Composition According to the Invention For the determination of relative transcript levels in RT-qPCR RNA was isolated from $10^6$ cultured human ovary adenocarcinoma (SK-OV3) cells, fixed in 1 ml of a fixative composition according to the invention (50% [v/v] Ethanol, 6% [w/v] acetic acid, 20% [v/v] Diethylene glycol monoethyl ether acetate, ad 100% with $ddH_2O$, pH unadjusted). After 5, 10, 20 or 60 min RNA was isolated from the cells. As a reference for delta Ct value calculation, RNA was also isolated from a cell pellet of $10^6$ cells directly lysed in RNeasy lysis buffer RLT (Qiagen) without incubation in the fixative composition.

One step quantitative RT-PCR assays were performed for amplicons within the mRNAs from p53, IL8, cFos, IL1β, Bactin and 18s genes. Ct values are shown as delta Cts. Delta Cts were calculated as Ct values obtain from RNA fixed for 5, 10, 20 or 60 min in the fixative composition according to the invention minus the Ct value obtained with RNA from directly lysed cells.

Delta-Ct values from RT-qPCR are shown in FIG. 11.

Example 12: Preparation of Cell Blocks with a Mixture of Tumors Cells, Whole Blood and Liver Extracts, Fixed with Fixative Compositions According to the Invention with Different pH 5 ml of a fixative composition according to the invention (50% [v/v] Ethanol, 6% [w/v] acetic acid, 20% [v/v] Diethylene glycol monoethyl ether acetate, ad 100% with $ddH_2O$) with pH unadjusted (A) or adjusted to pH3 with sodium hydroxide (B) were mixed with 1000 rat whole blood, rat liver extract and $10^6$ cultured human ovary adenocarcinoma (SK-OV3) cells. After storage for 7 days at ambient temperature, aliquots of 1 ml each were centrifuged and cell blocks in paraffin were prepared as described above. Sections of 4 µm were deparaffinised and stained with H&E (FIG. 12: 400× original magnification).

Morphology of tumor cells, white blood cells as well as liver cells was preserved. Tumor cells can be identified and distinguished from the liver cells based on different staining as well as the larger nuclei and the different ratio of nuclei to cytoplasma. In addition smaller blood leukocytes can be identified. Red blood cells appeared as empty shells or were completely destroyed. Within liver and tumor chromatin structures like nucleoli or metaphase chromosomes can be distinguished.

The invention claimed is:

1. A formalin-free fixative composition for fixing cells contained in a liquid sample comprising:

i) 30-70 vol % of an alcohol, selected from ethanol or isopropanol, ii) 4-15% of an organic acid, iii) 10-30% of a hydroxyl compound different from i), and iv) at least 10 vol % of water, the composition having a pH in the range of 2 to 5.

2. The fixative composition according to claim 1, consisting essentially of components i) to iv) and optionally a pH regulator.

3. The fixative composition according to claim 1, wherein the compound iii) is diethylene glycol monoethyl ether acetate (DEGMEA), diethylene glycol monoethyl ether, polyethylene glycol, or a diol or triol.

4. The fixative composition according to claim 1, wherein ii) the organic acid is acetic acid or propionic acid.

5. The fixative composition according to claim 1, wherein the composition comprises:

i) 40-60 vol % ethanol or isopropanol, ii) 4-10% of an organic acid, iii) 15-30% of a hydroxyl compound different from i), and iv) at least 10-vol % of water, the composition having a pH in the range of 2 to 5.

6. The fixative composition according to claim 1, wherein the compound iii) is selected from the group consisting of from ethylene glycol, diethylenglycol, glycerol, hexane triol, 1,3-butanediol, 2,3-butanediol, 1,3-propanediol, 1,5-pentandiol, 2-methyl-2,4-pentanediol, and dipropylglycol.

7. The fixative composition according to claim 1, wherein the composition consists of:

i) 40-60 vol % ethanol or isopropanol, ii) 4-10% of an organic acid, iii) 15-30% of a hydroxyl compound different from i), and iv) at least 10 vol % of water, the composition having a pH in the range of 2 to 5.

8. The fixative composition according to claim 5, wherein the composition comprises 40-60 vol % ethanol.

9. The fixative composition according to claim 5, wherein the organic acid is acetic acid.

10. A kit for preservation of cell-comprising liquid samples, comprising a fixative composition according to claim 1 and a container and optionally further at least one of the further ingredients:

A) means for collecting a liquid sample,

B) means for investigation of the cells comprised in the sample,

C) means and/or liquid solutions for biomolecule isolation,

D) means and/or liquid solutions for cell staining, and

E) means and/or liquid solutions for sample embedding.

11. The kit according to claim 10, wherein the kit further comprises the means for collecting a liquid sample.

12. The kit according to claim 11, wherein the means for collecting a liquid sample is a syringe, a tube, a container, a cup, a needle, a piercing or suction device.

13. The kit according to claim 10, wherein the kit further comprises the means for investigation of the cells comprised in the sample.

14. The kit according to claim 13, wherein the means for investigation of the cells comprised in the sample is a slide, a pipette, a membrane, or a filter.

15. A method of fixing, storing, or both, cells contained in a liquid sample, comprising contacting a formalin-free fixative composition with the liquid sample containing cells, the composition comprising:

i) 30-70 vol % of an alcohol, selected from ethanol or isopropanol, ii) 2-15% of an organic acid, iii) 10-30% of a hydroxyl compound different from i), and iv) at least 10 vol % of water, the composition having a pH in the range of 2 to 5.

16. The method according to claim 15, wherein the liquid sample containing cells comprises cells in an aqueous solution; any bodily fluid; an environmental water sample; or a food or beverage sample.

17. The method according to claim 15, wherein the cells are from human or animal; plant cells; or microorganisms.

18. The method according to claim 15, wherein the liquid sample containing cells is a fine needle aspiration sample.

19. A method of fixing cells contained in a liquid sample comprising the steps:

a) collecting the liquid sample containing the cells;

b) contacting at least a part of said liquid sample containing the cells according to the method of claim 6; and c) mixing the sample of step b).

20. The method according to claim 19, further comprising d) storing the sample.

21. The method according to claim 19, wherein the sample or part of the sample after step c) is further treated by at least one of the following methods: cytological investigation, biomolecule isolation, and/or embedding the cells with an embedding material.

22. The method according to claim 21, wherein more than one of the methods are carried out with aliquots of the same sample.

23. The method according to claim 21, including one or more of the following features:

i) the cytological investigation comprises at least one of cell sorting, cytocentrifugation, smearing or membrane filtration, cell staining, dissection, hybridization or immuno-histochemistry and microscopy;

ii) the biomolecule isolation comprises the isolation of at least one of nucleic acids, proteins, peptides, and peptide-nucleic acids; and iii) the embedding material is selected from paraffin, mineral oil, non-water soluble waxes, celloidin, polyethylene glycols, polyvinyl alcohol, agar, gelatine, nitrocelluloses, methacrylate resins, epoxy resins, or other plastic media.

* * * * *

UNITED STATES PATENT AND TRADEMARK OFFICE

CERTIFICATE OF CORRECTION

PATENT NO. : 10,794,803 B2
APPLICATION NO. : 15/305869
DATED : October 6, 2020
INVENTOR(S) : Daniel Grölz It is certified that error appears in the above-identified patent and that said Letters Patent is hereby corrected as shown below:

In the Claims

Column 20, Line 16 (Claim 19): “claim 6” should be replaced with --claim 15--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*